United States Patent
Liang et al.

(10) Patent No.: US 12,044,349 B2
(45) Date of Patent: Jul. 23, 2024

(54) DETACHABLE SUPPORTING DEVICE

(71) Applicant: Novium Taiwan Inc., Taipei (TW)

(72) Inventors: Kuo-Hung Liang, Chiayi County (TW); Ming-Wei Kuo, Taipei (TW)

(73) Assignee: Novium Taiwan Inc., Taipei (TW)

( * ) Notice: Subject to any disclaimer, the term of this patent is extended or adjusted under 35 U.S.C. 154(b) by 21 days.

(21) Appl. No.: 17/903,038

(22) Filed: Sep. 6, 2022

(65) Prior Publication Data
US 2023/0094251 A1  Mar. 30, 2023

(30) Foreign Application Priority Data

Sep. 27, 2021 (TW) .................... 110211327

(51) Int. Cl.
*F16M 11/04* (2006.01)
*H01F 7/02* (2006.01)

(52) U.S. Cl.
CPC ............ *F16M 11/041* (2013.01); *H01F 7/02* (2013.01)

(58) Field of Classification Search
CPC ........ F16M 11/041; H01F 7/02; H01F 7/0252
See application file for complete search history.

(56) References Cited

U.S. PATENT DOCUMENTS

| | | | | |
|---|---|---|---|---|
| 2,693,788 A * | 11/1954 | Spatz | ................ | B43M 99/004 |
| | | | | D19/75 |
| 5,506,459 A * | 4/1996 | Ritts | ................ | F16C 39/063 |
| | | | | 446/256 |
| 6,595,041 B2 * | 7/2003 | Hansen | ................ | G01G 7/00 |
| | | | | 73/514.31 |

(Continued)

FOREIGN PATENT DOCUMENTS

| CN | 201680242 U | * | 12/2010 | |
|---|---|---|---|---|
| CN | 112319098 A | * | 2/2021 | ........... B43K 23/04 |

(Continued)

OTHER PUBLICATIONS

Novium Hoverpen Intersteller edition sold on amazon.com dated Aug. 26, 2021, https://www.amazon.com/Novium-Hoverpen-2-0-Futuristic-Professional/dp/B09DKZZNKY?th=1 (Year: 2021).*

(Continued)

*Primary Examiner* — Terrell L McKinnon
*Assistant Examiner* — Ding Y Tan
(74) *Attorney, Agent, or Firm* — Winston Hsu (57) ABSTRACT

A detachable supporting device includes a base, an external component and a supporting portion. The base is put on a holding surface. The external component is detachably disposed on the base. A bar of the external component has a first end and a second end. A first magnetic member is disposed on the first end. A second magnetic member is disposed between the first end and the second end. The supporting portion is connected to the base. The supporting portion includes a first magnetic unit and at least one second magnetic unit. The first magnetic unit and the at least one second magnetic unit are disposed on different sides of the base respectively, wherein the first magnetic unit cooperates with the first magnetic member to provide a magnetic attraction force and the second magnetic unit cooperates with the second magnetic member to provide a magnetic repulsion force.

10 Claims, 5 Drawing Sheets

(56) References Cited

U.S. PATENT DOCUMENTS

| | | | | |
|---|---|---|---|---|
| 6,761,610 | B2* | 7/2004 | Fisher | A63H 33/26 |
| | | | | 40/661.01 |
| 7,348,691 | B2* | 3/2008 | Davis | H02N 15/00 |
| | | | | 310/90.5 |
| 8,258,663 | B2* | 9/2012 | Smoot | H02N 15/00 |
| | | | | 310/90.5 |
| 2003/0176144 | A1* | 9/2003 | Fisher | A63H 33/26 |
| | | | | 446/133 |
| 2009/0035050 | A1* | 2/2009 | Ramos | B43K 23/04 |
| | | | | 248/346.03 |
| 2018/0029404 | A1* | 2/2018 | Koga | B43K 23/001 |
| 2018/0319201 | A1* | 11/2018 | Koga | B43K 8/22 |

FOREIGN PATENT DOCUMENTS

| | | | | | |
|---|---|---|---|---|---|
| GB | 2164004 | A | * | 3/1986 | ............. B43K 29/00 |
| TW | 202128454 | A | * | 8/2021 | |

OTHER PUBLICATIONS

The clicky post online article titled "Hoverpen: the executive pen that defies gravity—a review" dated May 19, 2019, https://clickypost.com/blog/2019/5/19/hoverpen-the-executive-pen-that-defies-gravity-a-review (Year: 2019).*

Ash BBB on youtube.com dated Mar. 11, 2021 video titled "magnetic levitation/levitating pen", https://www.youtube.com/watch?v=_O--EgoXwoc (Year: 2021).*

Bee-a-maker on youtube.com dated Jun. 3, 2019 video titled "how to make a magnetic levitating pen", https://www.youtube.com/watch?v=nEVo22GH4aw (Year: 2019).*

* cited by examiner

DETACHABLE SUPPORTING DEVICE

BACKGROUND OF THE INVENTION

1. Field of the Invention

The present invention relates to a detachable supporting device, and more particularly, to a detachable supporting device for conveniently taking and putting a pen.

2. Description of the Prior Art

A ballpoint pen is often put on the reception counter of a shopping mall or an enterprise for customers. In a conventional arrangement method, a belt is tied to the end of the ballpoint pen for convenient use of being freely taken by the customers, and the ballpoint pen is restrained by the belt to prevent the ballpoint pen from falling out of the reception counter. For replacement of the ballpoint pen, it is necessary to cut or remove the belt to separate the glue or winding section from the ballpoint pen, which is inconvenient to use. Therefore, design of a supporting device that can fasten the ballpoint pen on the reception counter and the ballpoint pen can be easily taken and detached is an important issue in the related mechanical design industry.

SUMMARY OF THE INVENTION

The present invention provides a detachable supporting device for conveniently taking and putting a pen for solving the above drawbacks.

According to the claimed invention, a detachable supporting device includes a base, an external component and a supporting portion. The base has a first side and a second side opposite to each other. The base is put on a holding surface. The external component is detachably disposed on the base. A bar of the external component has a first end and a second end opposite to each other. A first magnetic member is disposed on the first end, and a second magnetic member is disposed between the first end and the second end. The supporting portion is connected to the base. The supporting portion includes a first magnetic unit and at least one second magnetic unit. The first magnetic unit is disposed on the first side and used to cooperate with the first magnetic member to provide a magnetic attraction force. The at least one second magnetic unit is disposed on the second side and used to cooperate with the second magnetic member to provide a magnetic repulsion force. The first magnetic unit and the at least one second magnetic unit are disposed between the second magnetic member and the base.

According to the claimed invention, the at least one second magnetic unit includes two magnetic pole surfaces, wherein one of the two magnetic pole surfaces corresponds to a specific magnetic pole surface of the second magnetic member, and another of the two magnetic pole surfaces corresponds to another specific magnetic pole surface of the second magnetic member.

According to the claimed invention, the base includes a top surface and a bottom surface opposite to each other. A planar normal vector of the top surface intersects or is parallel to a planar normal vector of the bottom surface. The supporting portion further includes a plurality of stretching sections arranged on and upwardly protruding from the top surface. At least one of the first magnetic unit and the at least one second magnetic unit are disposed on the plurality of stretching sections.

According to the claimed invention, the supporting portion further includes two second magnetic units, and the two second magnetic units are respectively disposed on different sides of the external component.

According to the claimed invention, the base includes a top surface and a bottom surface opposite to each other. The bottom surface abuts against the holding surface. The supporting portion is disposed on the top surface. A height of the second magnetic member relative to the bottom surface is greater than a height of the first magnetic member relative to the bottom surface.

These and other objectives of the present invention will no doubt become apparent to those of ordinary skill in the art after reading the following detailed description of the preferred embodiment that is illustrated in the various figures and drawings.

DETAILED DESCRIPTION

Figure 1:
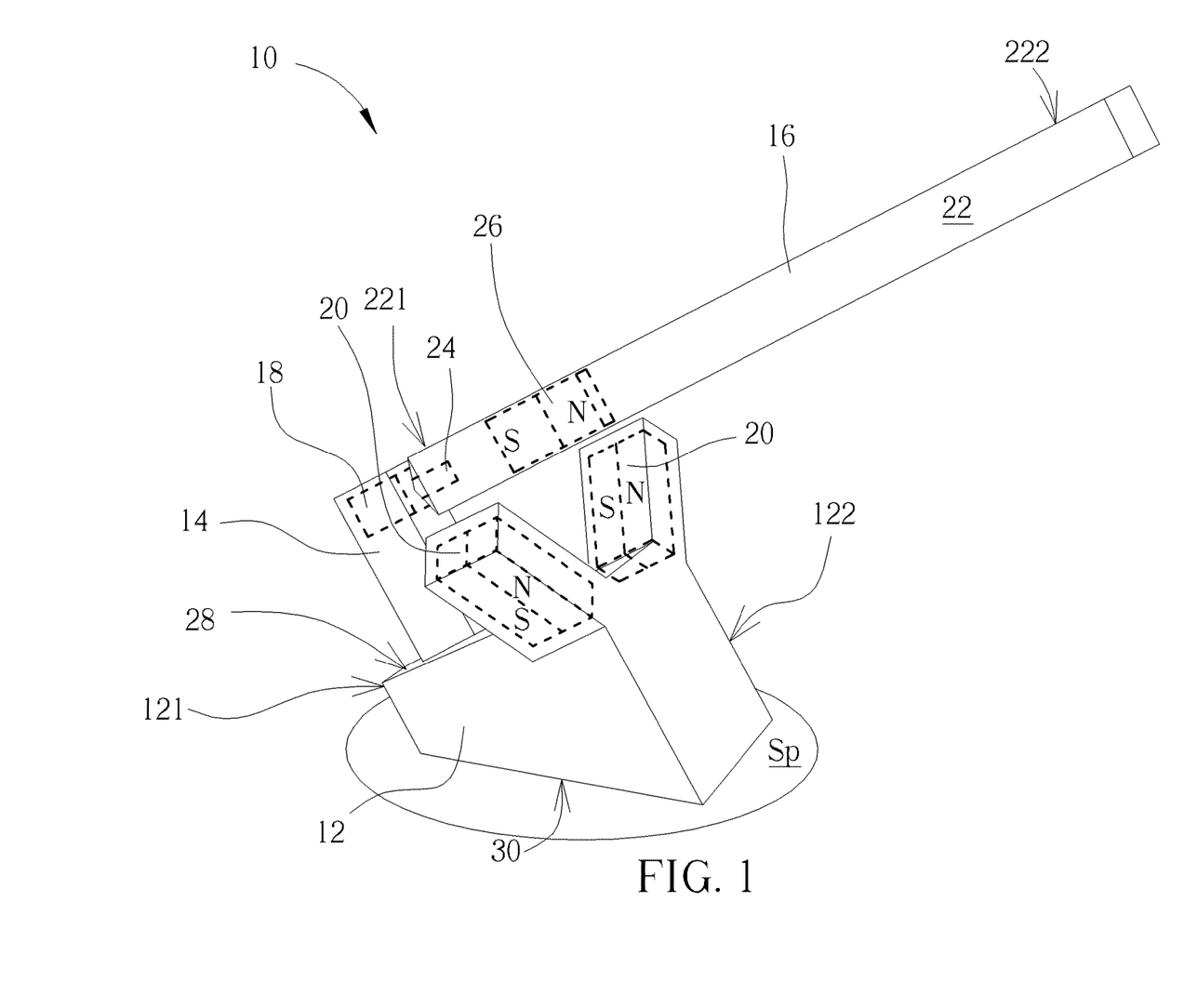
FIG. 1 and FIG. 2 are diagrams of a detachable supporting device in different views according to a first embodiment of the present invention.
Figure 2:
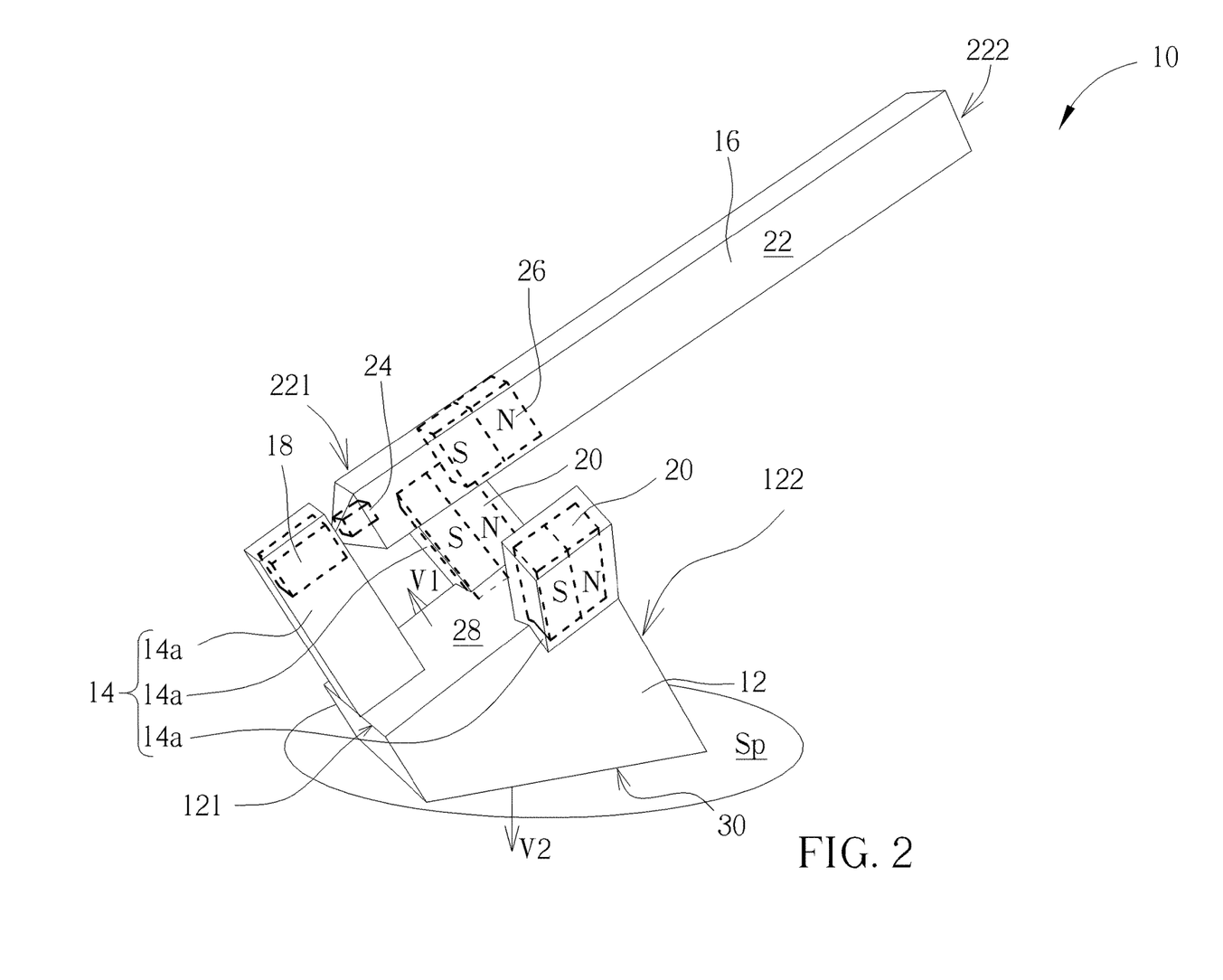

Please refer to FIG. 1 and FIG. 2. FIG. 1 and FIG. 2 are diagrams of a detachable supporting device 10 in different views according to a first embodiment of the present invention. The detachable supporting device 10 can include a base 12, a supporting portion 14 and an external component 16. The detachable supporting device 10 can be put on any place, such as on a table or on the ground that is defined as a holding surface Sp, according to a user's demand. The detachable supporting device 10 can be put on or held by the holding surface Sp via the base 12. A shape and a size of the base 12 are not limited to the embodiment shown in the figures, but depend on a design demand.

The supporting portion 14 can include a plurality of stretching sections 14a connected to the base 12. The plurality of stretching sections 14a can upwardly protrude from the base 12 and be used for arrangement of a plurality of magnetic units. The plurality of magnetic units can cooperate with a plurality of magnetic members of the external component 16 to suspend the external component 16. A number of the stretching sections 14a can depend on a number of the magnetic units as needed. For example, the detachable supporting device 10 in the first embodiment can have three magnetic units, and the supporting portion 14 can have three stretching sections 14a disposed on a first side 121 and a second side 122 of the base 12, as shown in FIG. 2. The three magnetic units can be, but not limited to, a first magnetic unit 18 disposed on the first side 121 and two second magnetic units 20 disposed on the second side 122. The first side 121 and the second side 122 are opposite sides of the base 12. The first magnetic unit 18 and the second magnetic units 20 are arranged as three corners in a triangle configuration on the base 12.

In the embodiment of the present invention, the external component 16 can be a pen for writing, which depends on actual applications without any limitation, and detailed descriptions for the variations of the external component 16 are omitted herein for simplicity. A bar 22 of the external component 16 can have a first end 221 and a second end 222 opposite to each other. A first magnetic member 24 can be disposed on the first end 221, and a second magnetic member 26 can be disposed between the first end 221 and the second end 222. Numbers and shapes of the first magnetic unit 18, the second magnetic unit 20, the first magnetic member 24 and the second magnetic member 26 are not limited to the embodiment shown in FIG. 1 and FIG. 2. The first magnetic member 24 can cooperate with the first magnetic unit 18 to provide a magnetic attraction force, and the magnetic attraction force can be used to attract and position the first end 221 of the external component 16. The second magnetic member 26 can cooperate with the second magnetic unit 20 to provide a magnetic repulsion force, so that the bar 22 can be suspended by the magnetic repulsion force. The external component 16 can be detached when a pulling force applied to the external component 16 is greater than the magnetic attraction force provided between the first magnetic member 24 and the first magnetic unit 18, which means the external component 16 can be disposed on the supporting portion 14 in a detachable manner.

A magnetic pole surface S of the second magnetic unit 20 can correspond to a magnetic pole surface S of the second magnetic member 26, and a magnetic pole surface N of the second magnetic unit 20 can correspond to a magnetic pole surface N of the second magnetic member 26. The second magnetic unit 20 can have four non-pole surfaces set between the magnetic pole surface S and the magnetic pole surface N. One of the four non-pole surfaces can face a lateral surface of the external component 16 when the external component 16 is suspended above the base 12. The magnetic pole surface N of the second magnetic unit 20 can be disposed on an inner part of the stretching section 14a to face the base 12, and the magnetic pole surface S of the second magnetic unit 20 can be disposed on an outer part of the stretching section 14a protruding from the base 12; or, the magnetic pole surface N of the second magnetic unit 20 may be disposed on an outer side of the stretching section 14a opposite to the first magnetic unit 18, and the magnetic pole surface S of the second magnetic unit 20 may disposed on an inner side of the stretching section 14a close to the first magnetic unit 18. Arrangement of the magnetic pole surface N and the magnetic pole surface S of the second magnetic unit 20 can depend on the design demand.

It should be mentioned that an interval between the second magnetic member 26 and the first end 221 can be preferably smaller than an interval between the second magnetic member 26 and the second end 222, so that assembly of the base 12 and the supporting portion 14 can have small and exquisite appearance. Generally, the interval between the second magnetic member 26 and the first end 221 can be one third of a length of the bar 22. The interval between the second magnetic member 26 and the second end 222 can be two thirds of the length of the bar 22. A ratio of the two intervals to the length of the bar 22 can depend on the design demand.

In the present invention, when the external component 16 is disposed on the supporting portion 14, the first magnetic unit 18 and the second magnetic unit 20 are disposed under the external component 16. Both the first magnetic unit 18 and the second magnetic unit 20 can be located between the base 12 and the second magnetic member 26 of the external component 16. That is, no magnetic unit is disposed on the upper portion (that is, the upper portion close to the second end 222) of the external component 16 to cooperate with the second magnetic member 26 for providing the magnetic attraction force or the magnetic repulsion force. Besides, the two second magnetic units 20 can be disposed on different sides or opposite sides of the external component 16, respectively; the magnetic pole surfaces N (or the magnetic pole surfaces S) of the two second magnetic units 20 can provide the magnetic repulsion force respectively toward two sides of the second magnetic member 26, and a tip of the external component 16 can contact the supporting portion 14 and the bar 22 of the external component 16 can be stably suspended above the supporting portion 14 via the magnetic repulsion force.

As shown in FIG. 1 and FIG. 2, the base 12 can have a top surface 28 and a bottom surface 30 opposite to each other. The supporting portion 14 can be put on the top surface 28 of the base 12. The bottom surface 30 can contact the holding surface Sp when the base 12 is placed. A planar normal vector V1 of the top surface 28 can intersect a planar normal vector V2 of the bottom surface 30. An included angle between the planar normal vector V1 and the planar normal vector V2 can depend on a suspension angle of the external component 16, which depends on the design demand. In the first embodiment, the first magnetic unit 18 can be disposed on a lower side of the top surface 28, and the second magnetic units 20 can be disposed on an upper side of the top surface 28; positions of the first magnetic unit 18 and the second magnetic units 20 can depend on the actual demand. When the tip of the external component 16 contacts the supporting portion 14 and the bar 22 of the external component 16 is suspended above the supporting portion 14, an included angle of the external component 16 relative to the holding surface Sp can be ranged from fifteen degrees to forty-five degrees, and an error of tolerance ranged from plus or minus 10% to 15% is allowed depending on a weight of the external component 16 and/or the magnetic repulsion force between the second magnetic member 26 and the second magnetic units 20.

Figure 3:
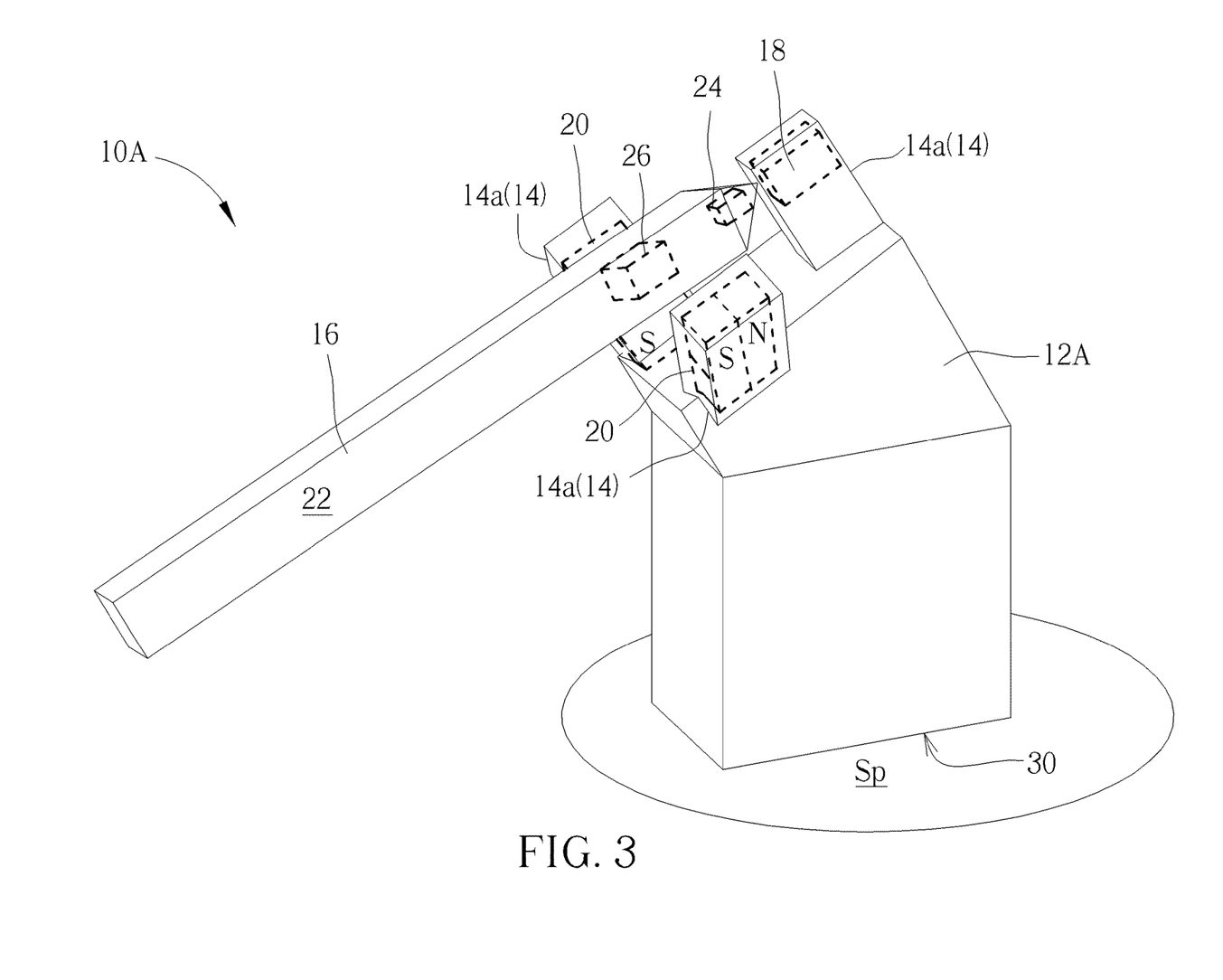
FIG. 3 is a diagram of the detachable supporting device according to a second embodiment of the present invention.

Please refer to FIG. 3. FIG. 3 is a diagram of a detachable supporting device 10A according to a second embodiment of the present invention. In the second embodiment, elements having the same numerals as ones in the first embodiment have the same structures and functions, and the detailed description is omitted herein for simplicity. The base 12A of the detachable supporting device 10A may have a structural height greater than a structural height of the base 12, and the external component 16 can be put on the base 12A with another angle, so as to prevent the external component 16 from hitting the holding surface Sp. In the second embodiment, the first magnetic unit 18 can be optionally disposed on the upper side of the top surface 28, and the second magnetic units 20 can be optionally disposed on the lower side of the top surface 28. When the tip of the external component 16 contacts the supporting portion 14 and the bar 22 of the external component 16 is suspended above the supporting portion 14, the included angle of the external component 16 relative to the holding surface Sp can be ranged from minus fifteen degrees to minus sixty degrees, and an error of tolerance ranged from plus or minus 10% to 15% is allowed depending on the weight of the external component 16 and/or the magnetic repulsion force between the second magnetic member 26 and the second magnetic units 20.

In the first embodiment and the second embodiment, the first magnetic unit 18 and the second magnetic units 20 are respectively disposed on the upper side and the lower side of the top surface 28, and structural dimensions of the plurality of stretching sections 14a may be similar in the two embodiments. In some possible embodiment (which is not shown in the figures), if the planar normal vector V1 of the top surface 28 is parallel to or substantially parallel to the planar normal vector V2 of the bottom surface 30, the structural size of the stretching section 14a on which the second magnetic unit 20 is disposed can be greater than the structural size of the stretching section 14a on which the first magnetic unit 18 is disposed (an inclined angle of the external component 16 relative to the holding surface Sp can be similar to the embodiment shown in FIG. 1 and FIG. 2), or the structural dimensions of the stretching section 14a on which the second magnetic unit 20 is disposed can be smaller than the structural dimensions of the stretching section 14a on which the first magnetic unit 18 is disposed (an inclined angle of the external component 16 relative to the holding surface Sp can be similar to the embodiment shown in FIG. 3), and therefore the external component 16 can be obliquely suspended above the supporting portion 14 via one-point touch.

In the first embodiment as shown in FIG. 1 and FIG. 2, a height of the first magnetic unit 18 relative to the bottom surface 30 can be greater than, or smaller than, or equal to a height of the second magnetic unit 20 relative to the bottom surface 30, which depends on an inclined angle of the external component 16 and the interval between the first magnetic unit 18 and the second magnetic units 20; in this condition, the magnetic repulsion force provided by the second magnetic units 20 and the second magnetic member 26 can suspend the second magnetic member 26 on position higher than position of the first magnetic unit 18 (which means that the height of the second magnetic member 26 relative to the bottom surface 30 can be greater than the height of the first magnetic unit 18 relative to the bottom surface 30). Most weight of the external component 16 can be held by the first magnetic unit 18 of the stretching section 14a, and less weight of the external component 16 is held by the magnetic repulsion force provided by the second magnetic units 20 and the second magnetic member 26. Thus, the external component 16 can be stably suspended above the supporting portion 14 via the one-point touch simply by a weak magnetic attraction force between the first magnetic unit 18 and the first magnetic member 24 and a weak magnetic repulsion force between the second magnetic units 20 and the second magnetic member 26.

In the second embodiment as shown in FIG. 3, if the external component 16 is connected to and suspended above the base 12A via the one-point touch in a reverse manner, the magnetic attraction force provided by the first magnetic unit 18 and the first magnetic member 24 may be strong and at least greater than the weight of the external component 16, so as to prevent the external component 16 from falling down due to gravity. The magnetic repulsion force provided by the second magnetic units 20 and the second magnetic member 26 can depend on the included angle of the external component 16 relative to the holding surface Sp, and the detailed description therefor is omitted herein for simplicity.

Figure 4:
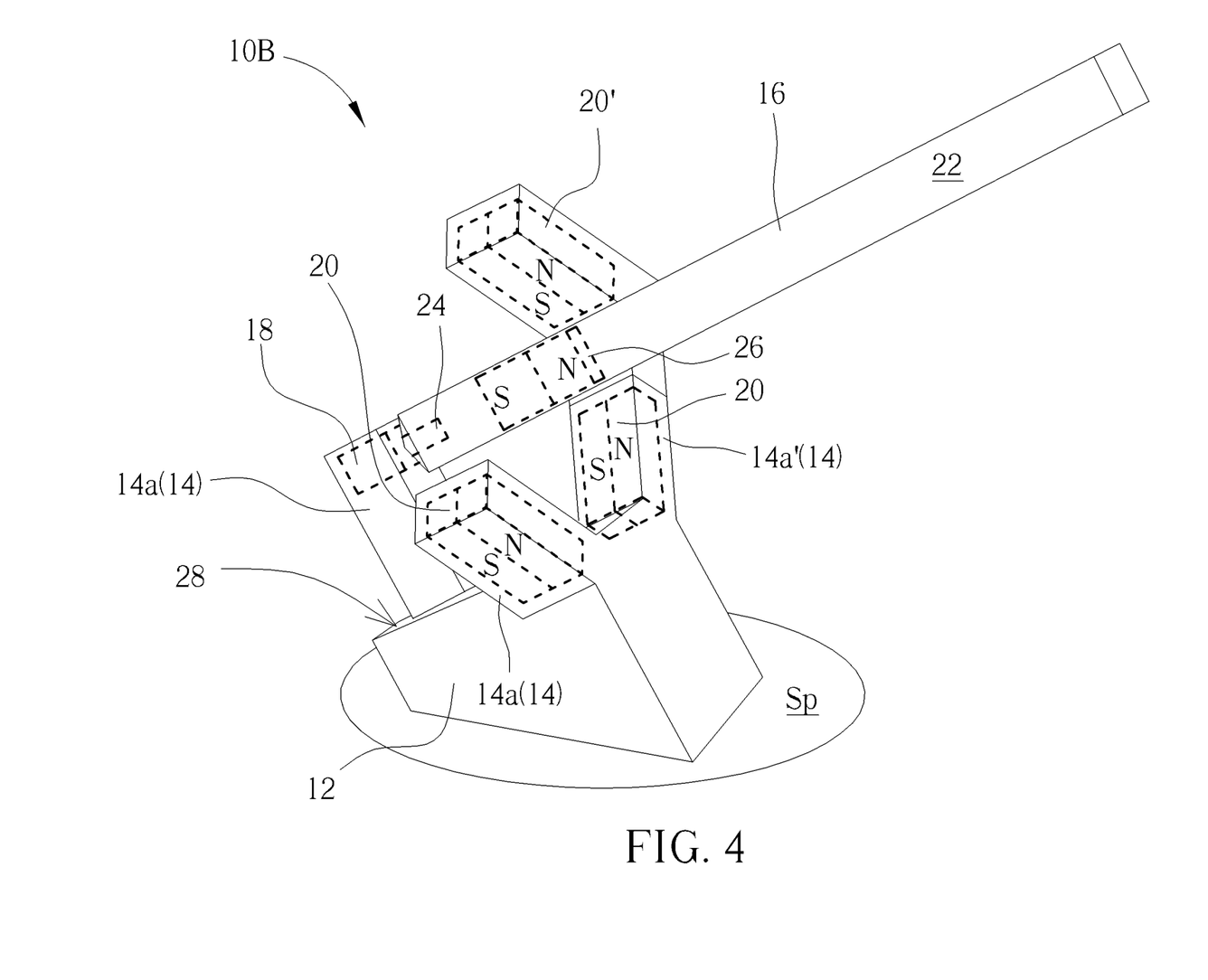
FIG. 4 is a diagram of the detachable supporting device according to a third embodiment of the present invention.

Please refer to FIG. 4. FIG. 4 is a diagram of a detachable supporting device 10B according to a third embodiment of the present invention. The supporting portion 14 of the detachable supporting device 10B can have the stretching section 14a and the stretching section 14a'. The stretching section 14a is designed as disclosed in the first embodiment and the second embodiment. The stretching section 14a' can upwardly extend to position above the external component 16. The second magnetic unit 20 may be disposed on a lower part of the stretching section 14a'. The second magnetic unit 20' may be disposed on an upper part of the stretching section 14a'. The second magnetic unit 20' can cooperate with the second magnetic member 26 to provide the magnetic repulsion force, such that the external component 16 can be stably suspended above the supporting portion 14 via the one-point touch.

Figure 5:
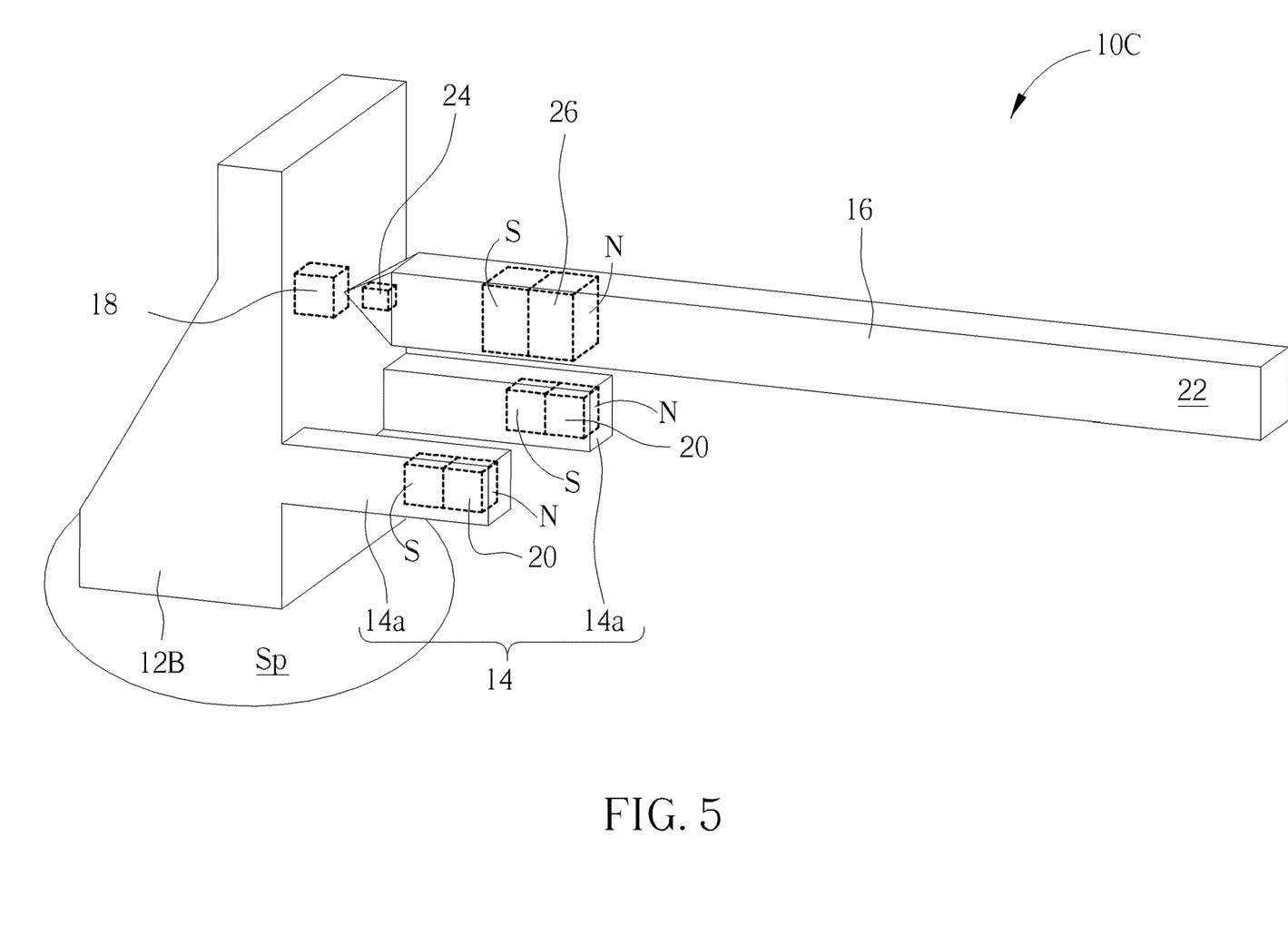
FIG. 5 is a diagram of the detachable supporting device according to a fourth embodiment of the present invention.

Please refer to FIG. 5. FIG. 5 is a diagram of a detachable supporting device 10C according to a fourth embodiment of the present invention. The external component 16 can be suspended by the detachable supporting device 10C to be parallel to the holding surface Sp; or, an included angle of the external component 16 relative to the horizon may be ranged from plus fifteen degrees to minus fifteen degrees. An outwardly extending degree of the stretching section 14a relative to a lateral surface of the base 12B of the detachable supporting device 10C can be adjusted, or the magnetic repulsion force provided by the second magnetic unit 20 and the second magnetic member 26 of the detachable supporting device 10C can be adjusted for changing the included angle of the external component 16 relative to the holding surface Sp.

One ordinarily skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable supporting device, comprising:
    a base having a first side and a second side opposite to each other, the base being put on a holding surface, the first side and the second side being two opposite edges of the base;
    an external component detachably disposed on the base, a bar of the external component having a first end and a second end opposite to each other, a first magnetic member being disposed on the first end, and a second magnetic member being disposed between the first end and the second end; and
    a supporting portion connected to the base, the supporting portion comprising:
        a plurality of stretching sections arranged on and upwardly protruding from the supporting portion;
        a first magnetic unit disposed on a top end of one of the plurality of stretching sections located above the first side and used to cooperate with the first magnetic member to provide a magnetic attraction force; and
        at least one second magnetic unit disposed on other stretching sections located above the second side and used to cooperate with the second magnetic member to provide a magnetic repulsion force.

2. The detachable supporting device of claim 1, wherein the first magnetic unit and the at least one second magnetic unit are disposed between the second magnetic member and the base.

3. The detachable supporting device of claim 1, wherein the at least one second magnetic unit comprises two magnetic pole surfaces, one of the two magnetic pole surfaces corresponds to a specific magnetic pole surface of the second magnetic member, and another of the two magnetic pole surfaces corresponds to another specific magnetic pole surface of the second magnetic member.

4. The detachable supporting device of claim 1, wherein the base comprises a top surface and a bottom surface opposite to each other, and a planar normal vector of the top surface intersects a planar normal vector of the bottom surface.

5. The detachable supporting device of claim 4, wherein the supporting portion further comprises a plurality of stretching sections arranged on and upwardly protruding from the top surface, at least one of the first magnetic unit and the at least one second magnetic unit are disposed on the plurality of stretching sections.

6. The detachable supporting device of claim 1, wherein the base comprises a top surface and a bottom surface opposite to each other, and a planar normal vector of the top surface is parallel to a planar normal vector of the bottom surface.

7. The detachable supporting device of claim 6, wherein the plurality of stretching sections upwardly protrudes from the top surface.

8. The detachable supporting device of claim 1, wherein the supporting portion further comprises two second magnetic units, and the two second magnetic units are respectively disposed on different sides of the external component.

9. The detachable supporting device of claim 1, wherein the base comprises a top surface and a bottom surface opposite to each other, the bottom surface abuts against the holding surface, the supporting portion is disposed on the top surface, and a height of the second magnetic member relative to the bottom surface is greater than a height of the first magnetic member relative to the bottom surface.

10. The detachable supporting device of claim 1, wherein an interval between the second magnetic member and the first end is smaller than an interval between the second magnetic member and the second end.

* * * * *